(12) United States Patent
Liang

(10) Patent No.: US 6,869,268 B2
(45) Date of Patent: Mar. 22, 2005

(54) COMBUSTION TURBINE WITH AIRFOIL HAVING ENHANCED LEADING EDGE DIFFUSION HOLES AND RELATED METHODS

(75) Inventor: George Liang, Palm City, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 113 days.

(21) Appl. No.: 10/235,173

(22) Filed: Sep. 5, 2002

(65) Prior Publication Data

US 2004/0047724 A1 Mar. 11, 2004

(51) Int. Cl.$^7$ ................................................ F01D 5/18
(52) U.S. Cl. ........................................ 415/115; 416/97 R
(58) Field of Search .................................. 415/115, 116; 416/96 R, 96 A, 97 R, 97 A

(56) References Cited

U.S. PATENT DOCUMENTS

| 3,527,543 | A | * | 9/1970 | Howald | 415/115 |
|---|---|---|---|---|---|
| 4,595,298 | A | | 6/1986 | Frederick | 416/97 R |
| 4,922,076 | A | * | 5/1990 | Cross et al. | 219/69.15 |
| 5,382,133 | A | * | 1/1995 | Moore et al. | 416/97 R |
| 5,486,093 | A | | 1/1996 | Auxier et al. | 416/97 R |
| 5,779,437 | A | * | 7/1998 | Abdel-Messeh et al. | 415/115 |
| 6,164,912 | A | | 12/2000 | Tabbita et al. | 416/97 R |
| 6,176,676 | B1 | * | 1/2001 | Ikeda et al. | 415/115 |
| 6,206,638 | B1 | | 3/2001 | Glynn et al. | 416/97 R |
| 6,243,948 | B1 | * | 6/2001 | Lee et al. | 29/889.1 |
| 6,379,118 | B2 | | 4/2002 | Lutum et al. | 416/97 R |
| 6,616,405 | B2 | * | 9/2003 | Torii et al. | 416/97 R |

* cited by examiner

*Primary Examiner*—F. Daniel Lopez
*Assistant Examiner*—Richard A Edgar

(57) ABSTRACT

A combustion turbine 20 includes a housing 22 and a plurality of airfoils 40 within the housing. Each airfoil 40 has a leading edge surface 42 and at least one interior cooling passageway 44. A plurality of diffusion holes 46 extend from the at least one interior cooling passageway 44 to the leading edge surface 42. Each diffusion hole 46 includes a proximal section 48 having a generally constant cross-sectional shape and a distal tapered section 50 that extends outwardly from the proximal section, tapering in a radially inward direction.

19 Claims, 5 Drawing Sheets

COMBUSTION TURBINE WITH AIRFOIL HAVING ENHANCED LEADING EDGE DIFFUSION HOLES AND RELATED METHODS

FIELD OF THE INVENTION

The present invention relates to the field of combustion turbines, and, more particularly, to combustion turbine airfoils.

BACKGROUND OF THE INVENTION

A combustion turbine typically comprises a compressor to draw in and compress a gas (usually air), a combustor to add energy to the compressed gas, and a turbine driven by the resulting expansion of heated gas. The turbine, in turn, can be used to power a wide range of equipment including ships, aircraft, and power generators.

The turbine typically comprises one or more stages of blade assemblies extending from a rotatable shaft and stationary guide vanes usually located adjacent the combustor. Both the blade assemblies and guide vanes typically comprise airfoils. An airfoil of a blade assembly usually extends outwardly from a platform connected to a root, which, in turn, is mounted to a turbine disk on the rotatable shaft. An airfoil of a guide vane is typically positioned between two stationary platforms. Hot gases from the combustor flow over the airfoils during operation of the combustion turbine causing the blade assembly to rotate.

Because of the high temperatures of the gases, it may be desirable to cool the airfoils. An approach to cooling an airfoil is to provide the airfoil with at least one interior passageway that carries a flow of cooling gas. Extending from the at least one interior passageway, may be a plurality of cooling holes that extend to the surface of the airfoil. As the gas exits the airfoil, it meets and is pushed by the flow of hot gas down and over the surface of the airfoil to form a cooling film.

U.S. Pat. No. 6,164,912 to Tabbita et al., for example, discloses providing a plurality of cooling holes or apertures spanwise along the leading edge of an airfoil. The cooling holes are curved and open at the surface of the leading edge to form oval shaped outlets whose major dimension is angled relative to the leading edge.

Forming non-linear cooling holes may be more difficult to manufacture as compared to linear ones thereby adding to the cost of manufacturing each airfoil. U.S. Pat. No. 6,379,118 to Lutum et al., for example, discloses linear or straight-hole cooling holes that extend from an interior passageway of an airfoil to its leading edge surface. The cooling holes are also angled in a radially upward direction toward the leading edge surface.

While such linear cooling holes may be more efficient in terms of manufacturing, the nature and shape of the airfoil typically constrains how large the outlet formed may be. The spanwise or radial dimension of the outlet (i.e., the breakout length), for example, is usually limited by the fact that cooling holes made by electro-discharge machining or by laser can be difficult to angle relative to the leading edge surface.

Accordingly, the breakout length may be less than desired since to increase the breakout length, the cooling hole would have to be formed at a shallow angle relative to the leading edge surface. If, however, the angle is too shallow relative to the leading edge surface, an electro-discharge device or other machining apparatus may skip across the leading edge surface. This, of course, could possibly damage the airfoil, but would not properly form the desired cooling hole. A laser beam at too shallow an angle, may reflect off the leading edge surface.

SUMMARY OF THE INVENTION

In view of the foregoing background, it is therefore an object of the present invention to provide a diffusion hole that is more efficient and/or easier to manufacture.

This and other objects, features, and advantages in accordance with the present invention are provided by a combustion turbine whose airfoils have diffusion holes that are each defined by a proximal section having a generally constant cross-sectional shape and a distal tapered section that tapers in a radially inward direction. The geometry is such that each diffusion hole has an expanded breakout length at the surface of the leading edge of the airfoil. Moreover, the geometry permits the diffusion holes to be more readily formed in the airfoil, given that the diffusion holes need not be formed at too shallow an angle relative to the leading edge surface.

The combustion turbine may also include a housing, and the plurality of airfoils may be radially positioned therein. The airfoils may be positioned within the housing to be rotatable when a gas flow impinges on surface portions of the airfoils. Each airfoil may have a leading edge surface and at least one interior cooling passageway. The plurality of diffusion holes may thus extend from the at least one interior cooling passageway to the leading edge surface.

The proximal section of a diffusion hole further may define an axis inclined at an angle. The angle may be in a range of about 20° to about 35° from tangent to the leading edge. The cross-sectional shape of the distal tapered section tapering outwardly from the proximal section along the radially inward direction may, moreover, taper at an angle in a range of about 5° to about 20°. The cross-sectional shape of the distal tapered section may define a distinct angular transition with the proximal section. Additionally, the cross-sectional shape of the distal tapered section may have no taper in the radially outward direction.

Each diffusion hole may have a length that, in relation to the diameter of the proximal section, defines a length to diameter ratio. According to the geometry of the diffusion hole, the length to diameter ratio may be in a range of about 10 to about 20. The distal tapered section of a diffusion hole may open at the leading edge surface of an airfoil in an oblong shape. The major dimension of the oblong shape may extend along the radially outward direction.

An additional aspect of the invention relates to a method of making diffusion holes in an airfoil for a combustion turbine. Where the airfoil has a leading edge surface and at least one interior cooling passageway, the method may include forming a plurality of diffusion holes to extend from the at least one interior cooling passageway to the leading edge surface. Each diffusion hole may be defined by a proximal section that has a generally constant cross-sectional shape and a distal tapered section connected thereto to define a taper in a radially inward direction.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
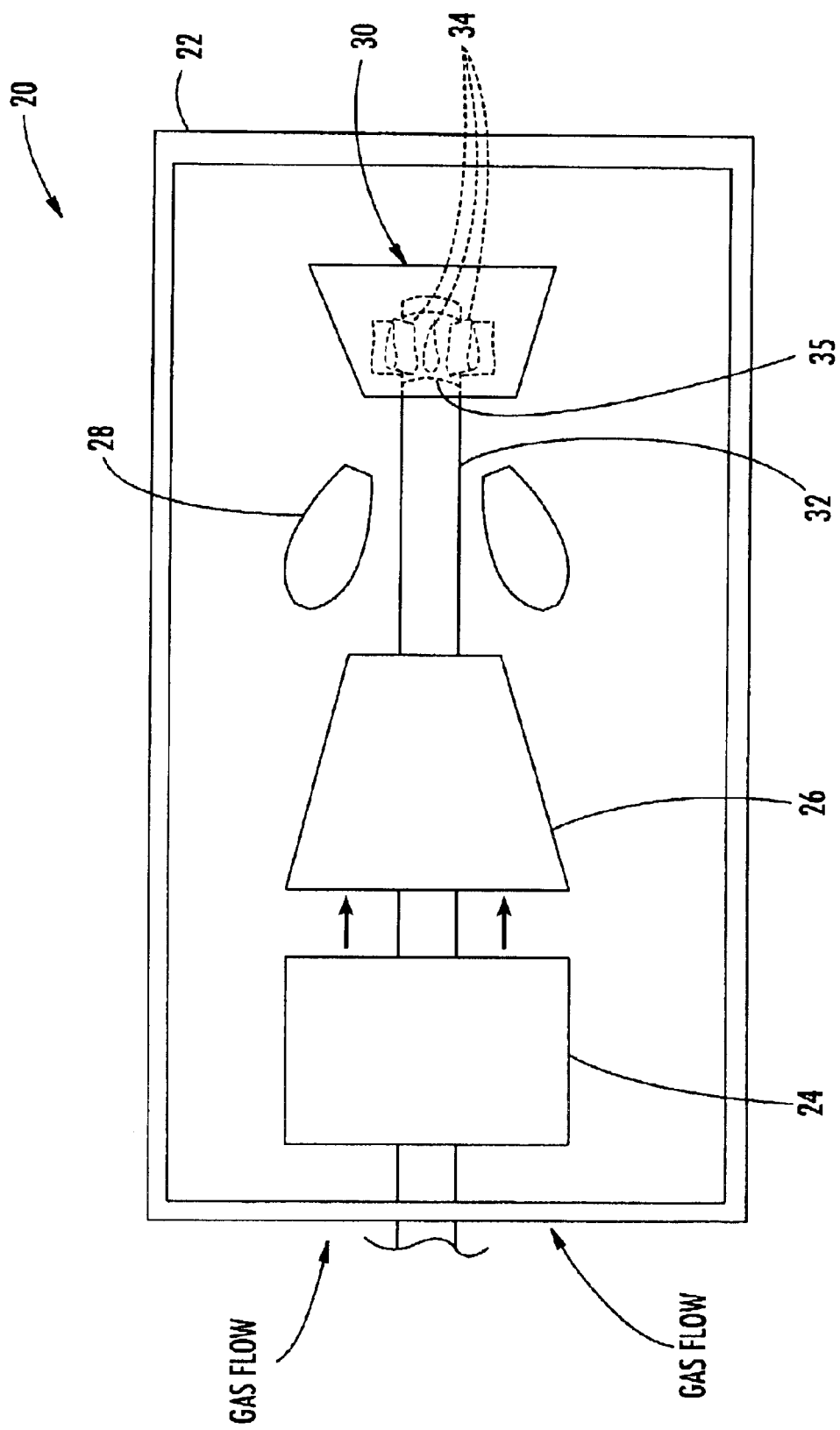
FIG. 1 is a schematic diagram of a combustion turbine according to the present invention.
Figure 2:
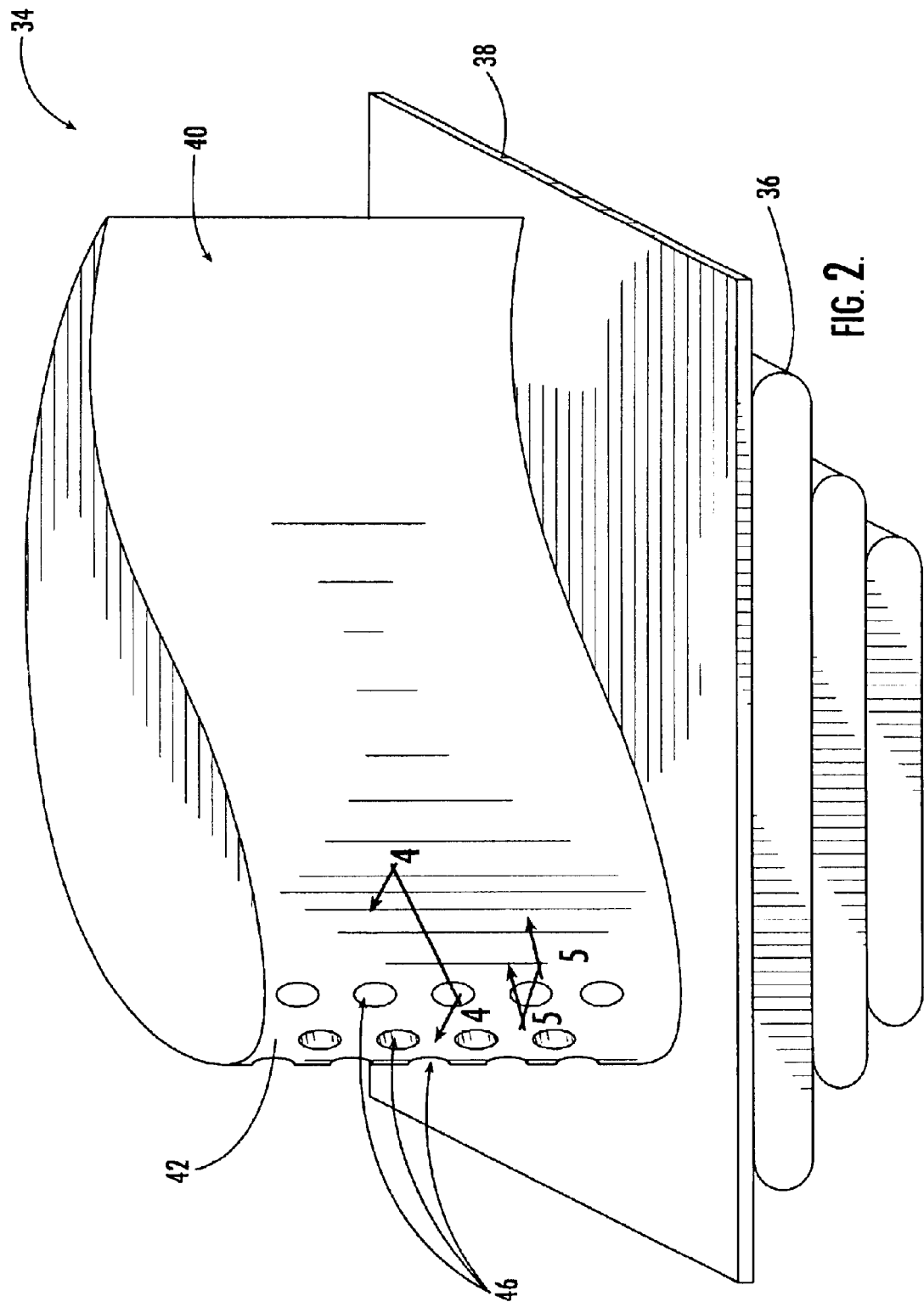
FIG. 2 is a perspective view of an airfoil of the combustion turbine in FIG. 1.

Referring initially to FIGS. 1–2, a combustion turbine 20 according to the present invention is described. The combustion turbine 20 illustratively includes a housing 22 and, within the housing, an inlet duct 24, a compressor 26 downstream from the inlet duct, a combustor 28 downstream from the compressor, and a turbine 30 downstream from the combustor. A shaft 32 illustratively extends through an upstream side of the housing 22 to the turbine 30. The combustion turbine 20 can be operated to rotate the shaft 32 and thereby drive other equipment such as an electrical power generator, for example, as will be readily understood by those skilled in the art.

Within the housing 22, a plurality of blade assemblies 34 are illustratively mounted on a turbine disk 35 on the shaft 32. Each blade assembly illustratively comprises a root 36 connected to the turbine disk 35, a platform 38 connected to an upper portion of the root, and an airfoil 40 that extends in a radially outward direction from the platform. Accordingly, the combustion turbine 20 illustratively includes a plurality of airfoils radially positioned within the housing 22. So positioned, the airfoils 40 are rotatable based upon a gas flow thereover.

Figure 3:
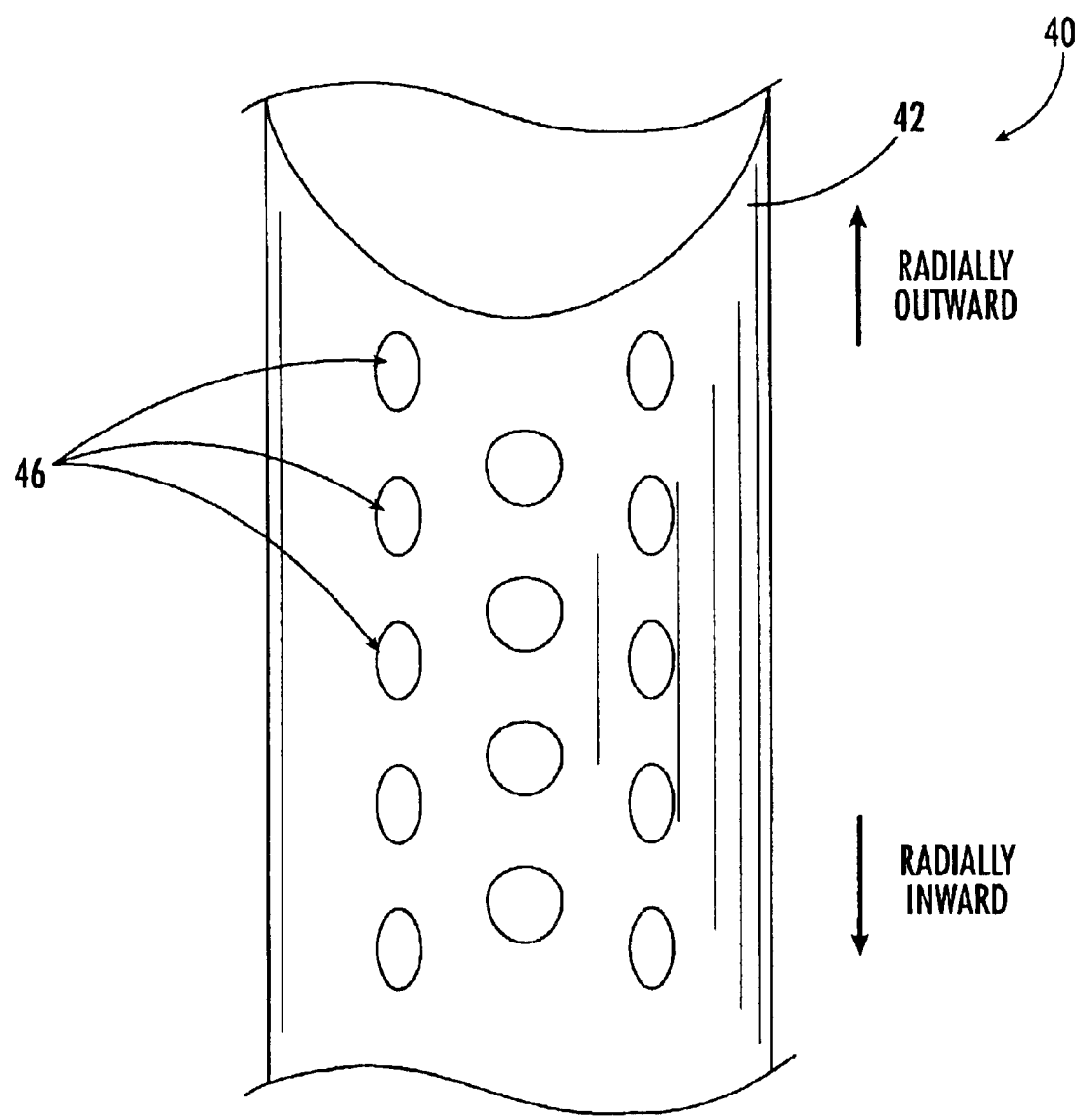
FIG. 3 is a perspective view of a portion of the leading edge surface of the airfoil in FIG. 2.
Figure 4:
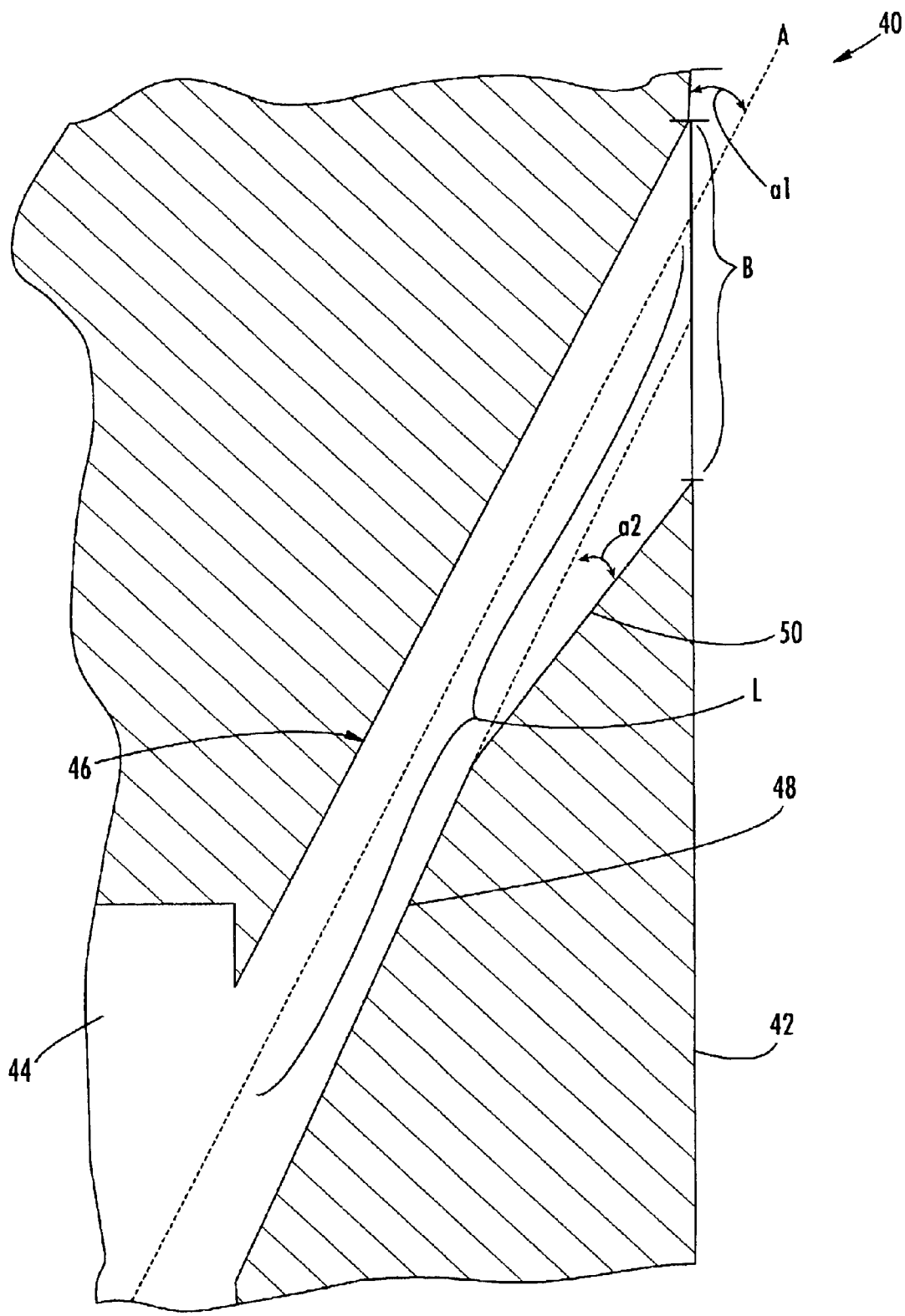
FIG. 4 is a cross-sectional view taken along line 4—4 of FIG. 2.
Figure 5:
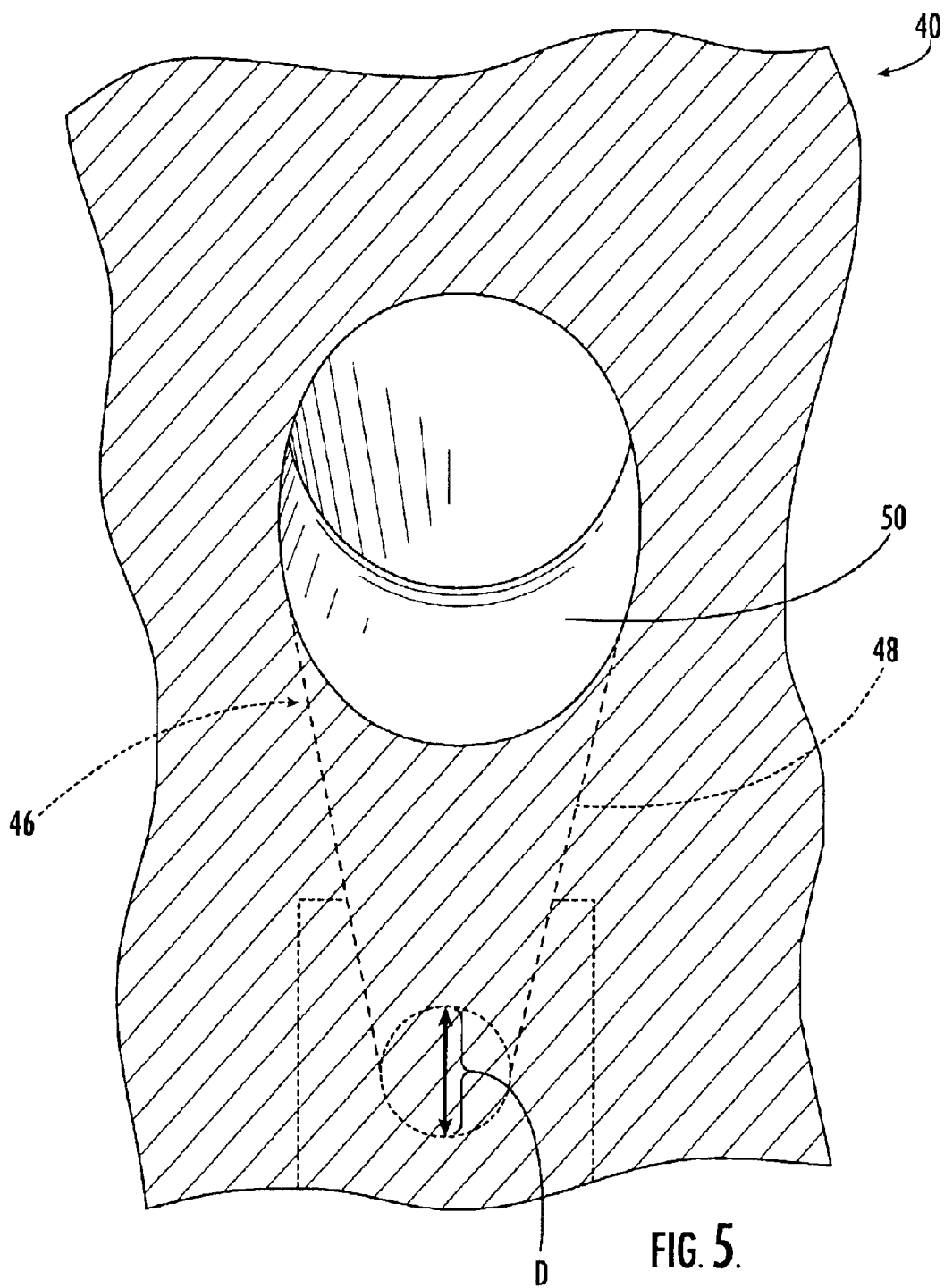
FIG. 5 is a greatly enlarged plan view of a diffusion hole as shown in the airfoil of FIG. 2.

Referring additionally now to FIGS. 3–5, each airfoil 40 illustratively has a leading edge surface 42 and at least one interior cooling passageway 44. A plurality of diffusion holes 46 illustratively extend from the at least one interior cooling passageway 44 to the leading edge surface 42.

Each diffusion hole 46 illustratively includes a proximal section 48 that has a generally constant cross-sectional shape. Illustratively, a distal tapered section 50 is connected to the proximal section 48 and extends outwardly therefrom, tapering in a radially inward direction.

As illustrated, the proximal section defines an axis A that is inclined at an angle a1 relative to the leading edge surface 42. The angle a1 may preferably be in a range of about 20° to about 35° from tangent to the leading edge surface 42. The angle a1 may more preferably be about 25°.

The cross-sectional shape of the distal tapered section 50 illustratively defines a distinct angular transition with the proximal section 48. As illustrated, the cross-sectional shape of the distal tapered section 50 tapers outwardly from the proximal section along the radially inward direction at an angle a2. The angle a2 preferably may be in a range of about 5° to about 20°. The angle a2, more preferably, may be about 10°. The cross-sectional shape of the distal tapered section 50 illustratively has no taper in the radially outward direction.

Although only one angular transition is illustrated, that of the distal tapered section 50 with the proximal section 48, one skilled in the art will readily understand that the distal tapered section 50 may itself include one or more angular transitions so that the taper increases in the radially inward direction. One skilled in the art will also readily understand that the taper may be smooth rather than defining distinct angular transitions.

Referring more particularly to FIG. 5, each diffusion hole 46 illustratively has a length L, and its proximal section 48 has a diameter D. The length L relative to the diameter D defines a ratio R=L/D. Based on the geometry of the diffusion hole, the ratio R may preferably be in a range of about 8 to about 20. The ratio R more preferably may be in a range of about 10 to about 12. As further illustrated, the distal tapered section 50 opens at the leading edge surface 42 in an oblong shape having a major dimension extending along the radially outward direction.

The geometry of the diffusion holes 46 of the present invention provides distinct advantages over conventional cooling holes. A major advantage is that the breakout length B of each diffusion hole 46 may be enhanced relative to that of a conventional cooling hole formed in a leading edge surface of an airfoil. Conventional cooling holes with a straight-hole configuration are typically angled relative to a leading edge surface. But to increase the breakout length of a conventional cooling hole having a straight-hole configuration, the cooling hole would typically need to be formed at a very shallow angle relative to the leading edge surface. This shallow angle may need to be about 14° or less.

With typical machining devices such as an electro-discharge machining apparatus, however, an attempt to form a shallow angle of less than about 20° risks causing the apparatus to skip across the surface of the leading edge. This may not only make for an unsuccessful attempt to enhance the breakout length, but it also may damage the airfoil. Relatedly, a laser beam at too shallow an angle, will reflect off the leading edge surface.

With the present invention, formation of each diffusion hole 46 in the leading edge surface 42 need not necessitate a shallow angle. For example, the angle a1 may preferably be in a range of about 20° to about 35°. More preferably the angle a1 may be about 25°. Nonetheless, the geometry of each diffusion hole, or, more particularly, the tapering of the distal section 50 allows for an enhanced breakout length B nonetheless. Not only is the breakout length B enhanced, but it is accomplished in an easier manner compared to conventional manufacturing methods. From a manufacturing perspective, moreover, it may be more efficient to form each diffucison hole so that the cross-sectional shape of the distal tapered section makes a distinct angular transition with the proximal section.

Accordingly, another aspect of the invention relates to a method for making diffusion holes 46 in an airfoil 40 for a combustion turbine 20, the airfoil having a leading edge surface 42 and at least one interior cooling passageway 44. The method illustratively comprises forming a plurality of diffusion holes 46 to extend from the at least one interior cooling passageway 44 to the leading edge surface 42. Each diffusion hole 46 is formed to include a proximal section 48 having a generally constant cross-sectional shape, and a distal tapered section 50 extending outwardly from the proximal section and tapering in a radially inward direction.

The method illustratively includes forming each diffusion hole 46 so that the proximal section 48 of each defines an axis inclined at an angle a1 that preferably may be in a range of about 20° to about 35° from tangent to the leading edge surface 42. More preferably, the angle a1 may be about 25°.

The method also illustratively includes forming each diffusion hole 46 so that the cross-sectional shape of the distal tapered section 50 of each tapers outwardly from its proximal section along the radially inward direction at an angle a2 that may preferably be in a range of about 5° to about 20°.

Forming according to the method further illustratively comprises forming each diffusion hole 46 such that a ratio R of a length L of the diffusion hole to a diameter D of its proximal section is preferably in a range of about 10 to about 20. The method also illustratively comprises forming each diffusion hole 46 such that cross-sectional shape of the distal tapered section 50 of each has no taper in the radially outward direction, and such that the distal tapered section of each opens at its leading edge surface in an oblong shape having a major dimension extending along the radially outward direction.

As will be readily understood by those skilled in the art, each diffusion hole 46 may alternately be formed using an electro-discharge machining apparatus or a laser. Other modes of forming such as using a high-pressure fluid stream will also be readily envisioned by those skilled in the art.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

What is claimed is:

1. An airfoil for a combustion turbine comprising:
   a leading edge surface;
   at least one interior cooling passageway; and
   a plurality of diffusion holes extending from the at least one interior cooling passageway to the leading edge surface;
   each diffusion hole being defined by a proximal section having a generally constant cross-sectional shape, and a distal tapered section connected thereto to define a taper in a radially inward direction, wherein the cross-sectional shape of the distal tapered section has no taper in the radially outward direction.

2. A combustion turbine comprising:
   a housing and a plurality of airfoils being radially positioned within said housing and being rotatable based upon a gas flow thereover, each airfoil having a leading edge surface, at least one interior cooling passageway, and a plurality of diffusion holes extending from the at least one interior cooling passageway to the leading edge surface;
   each diffusion hole being defined by a proximal section having a generally constant cross-sectional shape, and a distal tapered section connected thereto to define a taper in a radially inward direction, wherein the cross-sectional shape of the distal tapered section has no taper in the radially outward direction.

3. A method for making diffusion holes in an airfoil for a combustion turbine, the airfoil having a leading edge surface and at least one interior cooling passageway, the method comprising:
   forming a plurality of diffusion holes to extend from the at least one interior cooling passageway to the leading edge surface;
   each diffusion hole being defined by a proximal section having a generally constant cross-sectional shape, and a distal tapered section connected thereto to define a taper in a radially inward direction, wherein the cross-sectional shape of the distal tapered section of each has no taper in the radially outward direction.

4. An airfoil for a combustion turbine comprising:
   a leading edge surface;
   at least one interior cooling passageway; and
   a plurality of diffusion holes extending from the at least one interior cooling passageway to the leading edge surface;
   each diffusion hole having a length L and being defined by a proximal section having a generally constant cross-sectional shape and diameter D, wherein a ratio R defined by L/D is in the range of about 8 to about 20, and a distal tapered section connected thereto to define a taper in a radially inward direction and no taper in the radially outward direction, wherein the distal tapered section opens at the leading edge surface in an oblong shape having a major dimension extending along the radially outward direction.

5. An airfoil for a combustion turbine according to claim 4 wherein the proximal section defines an axis inclined at an angle in a range of about 20° to about 35° from tangent to the leading edge surface.

6. An airfoil for a combustion turbine according to claim 4 wherein the cross-sectional shape of the distal tapered section tapers outwardly from the proximal section along the radially inward direction at an angle in a range of about 5° to about 20°.

7. An airfoil for a combustion turbine according to claim 4 wherein, for each diffusion hole, a ratio of a length of the diffusion hole to a diameter of the proximal section of the diffusion hole is in a range of about 10 to about 20.

8. An airfoil for a combustion turbine according to claim 4 wherein the cross-sectional shape of the distal tapered section defines a distinct angular transition with the proximal section.

9. A combustion turbine comprising:
   a housing and a plurality of airfoils being radially positioned within said housing and being rotatable based upon a gas flow thereover, each airfoil having a leading edge surface, at least one interior cooling passageway, and a plurality of diffusion holes extending from the at least one interior cooling passageway to the leading edge surface;
   each diffusion hole having a length L and being defined by a proximal section having a generally constant cross-sectional shape and diameter D, wherein a ratio R defined by L/D is in the range of about 8 to about 20, and a distal tapered section connected thereto to define a taper in a radially inward direction and no taper in the radially outward direction, wherein the distal tapered section opens at the leading edge surface in an oblong shape having a major dimension extending along the radially outward direction.

10. A combustion turbine according to claim 9 wherein the proximal section defines an axis inclined at an angle in a range of about 20° to about 35° from tangent to the leading edge surface.

11. A combustion turbine according to claim 9 wherein the cross-sectional shape of the distal tapered section tapers outwardly from the proximal section along the radially inward direction at an angle in a range of about 5° to about 20°.

12. A combustion turbine according to claim 9 wherein, for each diffusion hole, a ratio of a length of the diffusion hole to a diameter of the proximal section of the diffusion hole is in a range of about 10 to about 20.

13. A combustion turbine according to claim 9 wherein the cross-sectional shape of the distal tapered section defines a distinct angular transition with the proximal section.

14. A method for making diffusion holes in an airfoil for a combustion turbine, the airfoil having a leading edge surface and at least one interior cooling passageway, the method comprising:

forming a plurality of diffusion holes to extend from the at least one interior cooling passageway to the leading edge surface;

each diffusion hole having a length L and being defined by a proximal section having a generally constant cross-sectional shape and diameter D, wherein a ratio R defined by L/D is in the range of about 8 to about 20, and a distal tapered section connected thereto to define a taper in a radially inward direction and no taper in the radially outward direction, the distal tapered section of each opens at the leading edge surface in an oblong shape having a major dimension extending along the radially outward direction.

15. A method according to claim 14 wherein forming comprises forming each diffusion hole so that the proximal section of each defines an axis inclined at an angle in a range of about 20° to about 35° from tangent to the leading edge surface.

16. A method according to claim 14 wherein forming comprises forming each diffusion hole so that the cross-sectional shape of the distal tapered section of each tapers outwardly from its proximal section along the radially inward direction at an angle in a range of about 5° to about 20°.

17. A method according to claim 14 wherein forming comprises forming each diffusion hole such that a ratio of a length of the diffusion hole to a diameter of its proximal section is in a range of about 10 to about 20.

18. A method according to claim 14 wherein forming comprises forming each diffusion hole using an electro-discharge machining apparatus.

19. A method according to claim 14 wherein forming comprises forming each diffusion hole using a laser.

* * * * *